(12) United States Patent
Peters

(10) Patent No.: US 10,408,314 B2
(45) Date of Patent: Sep. 10, 2019

(54) METHODS AND APPARATUS FOR SELECTIVE ROD ACTUATION

(71) Applicant: Massachusetts Institute of Technology, Cambridge, MA (US)

(72) Inventor: Benjamin Peters, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 296 days.

(21) Appl. No.: 15/582,777

(22) Filed: May 1, 2017

(65) Prior Publication Data

US 2017/0234414 A1    Aug. 17, 2017

Related U.S. Application Data

(63) Continuation of application No. 14/484,567, filed on Sep. 12, 2014, now Pat. No. 9,664,265.

(60) Provisional application No. 61/877,248, filed on Sep. 12, 2013.

(51) Int. Cl.
| | | |
|---|---|---|
| *F16H 25/02* | (2006.01) | |
| *F16H 25/12* | (2006.01) | |
| *H02K 7/14* | (2006.01) | |
| *B28B 7/02* | (2006.01) | |
| *B29C 33/30* | (2006.01) | |
| *F16H 25/18* | (2006.01) | |

(52) U.S. Cl.
CPC ............ *F16H 25/12* (2013.01); *F16H 25/02* (2013.01); *H02K 7/14* (2013.01); *B28B 7/02* (2013.01); *B29C 33/308* (2013.01); *F16H 25/18* (2013.01); *Y10T 74/18576* (2015.01)

(58) Field of Classification Search
CPC .......... F16H 25/02; F16H 25/12; F16H 25/18; B28B 7/02; H02K 7/14; Y10T 74/18576; B29C 33/308

USPC ................. 74/99 R; 249/155; 425/182, 193; 264/219

See application file for complete search history.

(56) References Cited

U.S. PATENT DOCUMENTS

| | | | |
|---|---|---|---|
| 4,210,837 A | 7/1980 | Vasiliev et al. | |
| 4,212,188 A | 7/1980 | Pinson | |
| 5,187,969 A | 2/1993 | Morita | |
| 5,330,343 A * | 7/1994 | Berteau | B28B 7/025 249/155 |

(Continued)

OTHER PUBLICATIONS

Munro, C., et al. (2007). Reconfigurable Pin-Type Tooling: A Survey of Prior Art and Reduction to Practice. Journal of Manufacturing Science and Engineering, 2007, vol. 129, Issue 3, p. 551-565.

(Continued)

*Primary Examiner* — Terence Boes
*Assistant Examiner* — Randell J Krug
(74) *Attorney, Agent, or Firm* — Stephen R. Otis

(57) ABSTRACT

In exemplary implementations, a target rod is actuated. The target rod is part of a set of threaded, elongated rods, the longitudinal axes of which are substantially parallel to each other. The set of rods has an interior region and a perimeter region. Actuators induce vibrations in a set of perimeter rods. These vibrations are substantially perpendicular to the longitudinal axes. Furthermore, the vibrations are transmitted to interior rods, causing a target rod in the interior region to rotate about, and translate along, the longitudinal axis of the target rod. The target rod undergoes stick-slip motion relative to adjacent rods.

13 Claims, 13 Drawing Sheets

(56) References Cited

U.S. PATENT DOCUMENTS

| | | | |
|---|---|---|---|
| 5,513,972 A * | 5/1996 | Schroeder | B21D 37/02 249/155 |
| 5,546,313 A | 8/1996 | Masters | |
| 5,546,784 A | 8/1996 | Haas et al. | |
| 5,796,620 A | 8/1998 | Laskowski et al. | |
| 6,012,314 A | 1/2000 | Sullivan et al. | |
| 6,089,061 A | 7/2000 | Haas et al. | |
| 6,209,380 B1 | 4/2001 | Papazian et al. | |
| 6,578,399 B1 | 6/2003 | Haas et al. | |
| 6,903,871 B2 | 6/2005 | Page | |
| 2012/0105820 A1 | 5/2012 | Nawata et al. | |

OTHER PUBLICATIONS

Cook, N., et al. (2008) A Novel Multipin Positioning System for the Generation of High-Resolution 3-D Profiles by Pin-Arrays. In IEEE Transactions on Automation Science and Engineering, vol. 5, Issue 2, pp. 216-222, Apr. 2008.

Walczyk, D., et al. (1998) Design and Analysis of Reconfigurable Discrete Dies for Sheet Metal Forming. Journal of Manufacturing Systems, vol. 17, Issue 6, 1998, pp. 436-454.

Vose, T., et al. (2007) Vibration-Induced Frictional Force Fields on a Rigid Plate. IEEE International Conference on Robotics and Automation, pp. 660-667, IEEE, 2007.

Zhang, J., et al. (2011) Analysis for the stick-slip motion of differential power screw actuator. Proc. SPIE 8191, International Symposium on Photoelectronic Detection and Imaging 2011: Sensor and Micromachined Optical Device Technologies, 81911J (Sep. 8, 2011); doi:10.1117/12.900724.

Zesch, W., et al. (1995) Inertial drives for micro- and nanorobots: two novel mechanisms. Proc. SPIE 2593, Microrobotics and Micromechanical Systems, 80 (Dec. 18, 1995); doi:10.1117/12.228638.

Physik Instrumente (PI) GMBH & Co. (2012), PIShift Piezoelectric Inertia Drives, www.pi.ws.

* cited by examiner

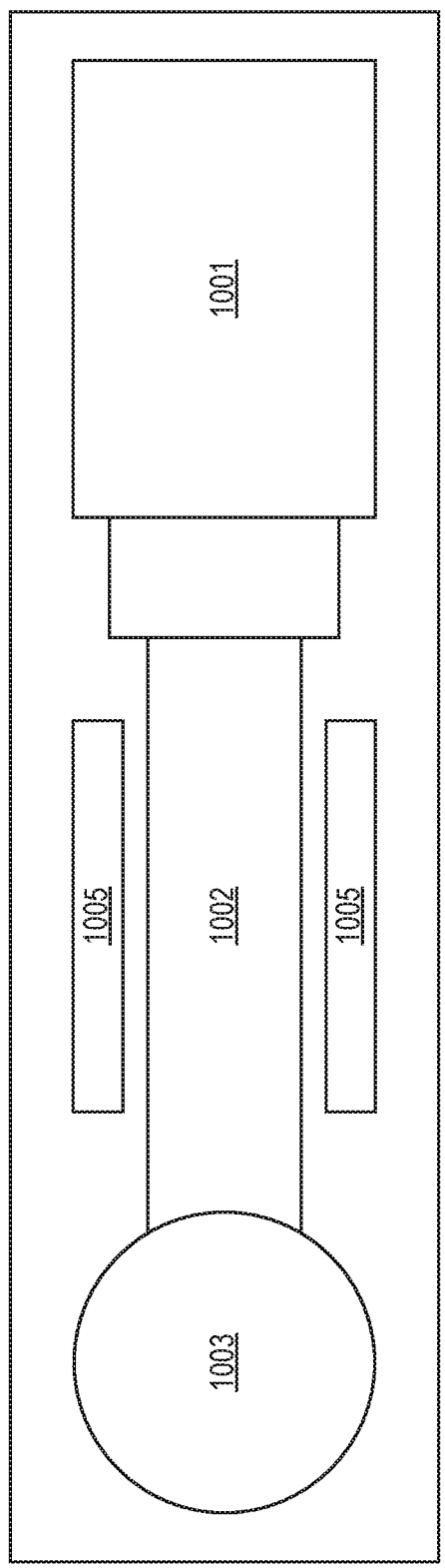

METHODS AND APPARATUS FOR SELECTIVE ROD ACTUATION

RELATED APPLICATIONS

This application is a continuation of U.S. application Ser. No. 14/484,567 filed Sep. 12, 2014, which claims the benefit of U.S. Provisional Application No. 61/877,248, filed Sep. 12, 2013 (the "248 application"). The entire disclosure of the 248 application is herein incorporated by reference.

FIELD OF THE TECHNOLOGY

The present invention relates generally to actuation of rods.

SUMMARY

In exemplary implementations of this invention, linear actuators are situated along the perimeter of a close-packed array of threaded rods. Vibrations, resulting from the action of the linear actuators along the perimeter of the array, cause the threaded rods in the interior of the array to move up and down, along their longitudinal axes. This actuation is selective, such that an individual rod is actuated (or multiple rods are actuated) to move relative to the rest of the array. For example, in some cases, the linear actuators along the perimeter of the array transmit vibrations into the array and cause a single rod in the center of the array to rise up or to go down, relative to the rest of the array.

In exemplary implementations, a target rod in a close-packed array of rods undergoes motion along the longitudinal axis of the target rod. This axial motion is caused by periodic or aperiodic vibration generated by pairs of orthogonally positioned actuators. The actuators are linear actuators, positioned along the perimeter of the array. The periodic or aperiodic vibrations rotate the target rod, which is located in a region of the array that is intersected by these vibrations. By changing which linear actuators (on the perimeter of the array) are causing vibration, different rods in the interior of the array are actuated. Addressing the array along the edges of the rows and columns of rods reduces the number of control inputs from a given quadratic number of rods to a linearly increasing value.

In some implementations, processors perform calculations to choose system inputs that result in (a) the frequency range of vibration inputs needed to cause stick-slip motion of a target rod, given initial system parameters, (b) a minimum forward displacement force, and (c) a minimum reverse displacement force.

In exemplary implementations, processors calculate system inputs and motion of the actuators according to one or more initial system parameters (such as rod diameter, pre-load force, rod friction coefficients, or rod mass density). These calculations allow for a predictable, localized expression of the edge-addressed vibration inputs. Properly calculated system operating conditions will result in reliable actuation in even an open-loop feedback system.

This invention has many practical applications. For example, in some cases, this invention actuates discrete rods in an array of closely-packed rods. Tips of the rods form a high resolution, reconfigurable surface. For example, in some cases, the tip of a first rod is moved to a first height, the tip of a second rod is moved to a second height, and so on. Because the rods are closely packed, the tips of the rods comprise, or define the shape of, a reconfigurable surface. In some cases, the tips of the rods are covered with one or more flexible membranes, in order to create a continuous surface. The surface is reconfigurable, in that the relative heights of the rods are adjusted by selectively actuating different rods in the array.

In exemplary implementations, different rods are actuated to change the shape of the reconfigurable surface, in order to produce strong, detailed reliefs and to undergo fast surface reconfiguration. For example, in some cases, the reconfigurable surface comprises, or defines a shape of, a reconfigurable mold used in manufacturing.

In exemplary implementations, a target rod is actuated. The target rod is part of a set of threaded, elongated rods, the longitudinal axes of which are substantially parallel to each other. The set of rods has an interior region and a perimeter region. The set of rods includes interior rods that are in the interior region and perimeter rods that are in the perimeter region. One or more actuators that are connected to a set of perimeter rods induce vibrations in the set of perimeter rods. These vibrations are substantially perpendicular to the longitudinal axes and are transmitted to interior rods, causing a target rod in the interior region to rotate about, and translate along, the longitudinal axis of the target rod. The target rod undergoes stick-slip motion relative to rods adjacent to the target rod.

In exemplary implementations, the set of rods comprises a system. The total energy of the system depends in part on the spatial arrangement of the rods relative to each other. The total energy of the system is higher when the set of rods is arranged in a square packing arrangement (e.g., as shown in FIG. 3B) than when the set of rods is in any other arrangement, other factors being equal.

In some implementations, the actuators are adjacent to, or connected to, the set of perimeter rods.

In some implementations, a single actuator, through a set of mass-spring pairs, drives vibrations of a set of multiple perimeter rods. The mass-spring pairs have different natural frequencies. When the single actuator vibrates at the natural frequency of a given mass-spring pair, the amplitude of vibration of the given mass-spring pair may increase dramatically, according to the quality factor of the system. The frequency of vibration of the single actuator is controllable, and can be adjusted to match the different natural frequencies of the different mass-spring pairs, and thus to select which mass-spring pair (and the perimeter rod that the mass-spring pair drives) has the largest amplitude of vibration.

In some implementations, a computer (e.g., a microprocessor) is programmed to control the actuators, such that the vibrations cause a target rod to undergo stick-slip motion relative to rods that are adjacent to the target rod.

In exemplary implementations, a set of one or more rods are adjacent to a target rod. The target rod and adjacent rods are threaded rods. The target rod and adjacent rods are elongated along their respective longitudinal axes. These longitudinal axes are substantially parallel to each other.

In some implementations, one or more actuators cause oscillations in the rods adjacent to the target rod. During the oscillations, the target rod undergoes stick-slip motion relative to the adjacent rods. During the slip portion of the stick-slip motion, the target rod moves in a direction substantially perpendicular to its longitudinal axis, but does not rotate about its longitudinal axis. During the stick portion of the stick-slip motion, the target rod moves in a direction substantially perpendicular to it longitudinal axis, while rotating about its longitudinal axis.

In exemplary implementations, each oscillation of a rod includes a forward stroke and a reverse stroke, which are in substantially opposite directions. The target rod undergoes stick-slip motion relative to the adjacent rods, with more "sticking" in the reverse stroke than in the forward stroke. During the reverse stroke, "sticking" occurs between the threads of the target rod and the threads of adjacent rods as the rods translate relative to each other in a lateral direction (perpendicular to the longitudinal axes of the rods). During this "sticking", the target rod rotates about, and undergoes axial motion along, its longitudinal axis. In contrast, during the forward stroke, "slipping" occurs between the threads of the target rod and the threads of adjacent rods as the rods translate relative to each other in a lateral direction. During this "slipping", the target rod does not rotate about, or undergo axial motion along, its longitudinal axis.

In exemplary implementations, stick-slip motion of two surfaces relative to each other is triggered by: (a) a force that causes a change in acceleration, or (b) a geometry rearrangement that causes a change in the direction of application of friction forces.

In examples discussed above: (a) "sticking" (and axial movement of the target rod along its longitudinal axis) occurs primarily during the return stroke; and (b) "slipping" (and lack of axial movement of the target rod along its longitudinal axis) occurs primarily during the forward stroke.

In some implementations, the total energy expended to move a rod during the forward stroke is less than the total energy expended to move the rod during the reverse stroke. That is due, at least in part, to the fact that the reverse stroke is working against a preload force, and the forward stroke is not, as discussed below.

In some implementations, a preload force is applied to rods. In some cases, the preload force is substantially constant. The rods tend to displace into a so-called "collapsing lattice" arrangement during a forward stroke and to displace into a square packed arrangement during a reverse stroke. It requires more energy for the reverse stroke (which moves from a collapsing lattice arrangement to a square packed arrangement) than for the forward stroke (which moves from a square packed arrangement to a collapsing lattice arrangement). This is because the reverse stroke of a rod includes a component of motion that is opposite in direction to a preload force applied to the rod, whereas the first stroke does not. The fact that the reverse stroke is working against the preload force (and the forward stroke is not), tends to cause friction (between the target rod and adjacent rods) to be greater during the reverse stroke than during the forward stroke.

An example of a "collapsing lattice" arrangement of rods is shown in FIG. 5B. The "collapsing lattice effect" is the tendency of a square lattice arrangement to distort due to preload forces during a portion of a vibration. For example, the transition from the arrangement shown in FIG. 5A to the arrangement shown in FIG. 5B illustrates the "collapsing lattice effect".

In some implementations, the maximum acceleration that the target rod undergoes during the forward stroke is less than the maximum acceleration that the target rod undergoes during the reverse stroke.

In some implementations, the oscillations are in directions that are substantially perpendicular to the longitudinal axis of the target rod.

In some cases, multiple target rods simultaneously or sequentially undergo axial motion. This axial motion is along their longitudinal axes.

In some cases, the axial motions of the target rods alter the shape of a surface, which surface includes, or is defined by position of, tips of the target rods.

The description of the present invention in the Summary and Abstract sections hereof is just a summary. It is intended only to give a general introduction to some illustrative implementations of this invention. It does not describe all of the details of this invention. This invention may be implemented in many other ways. Likewise, the description of this invention in the Field of the Technology section is not limiting; instead it identifies, in a general, non-exclusive manner, a field of technology to which exemplary implementations of this invention generally relate.

BRIEF DESCRIPTION OF THE DRAWINGS

FIG. 5A shows rods in a square packing, before rods are displaced. FIG. 5B shows forward displacement of a row of rods. FIG. 5C shows reverse displacement of the row of rods.

FIG. 7 shows the direction of the forward displacement. FIG. 8 shows the direction of the reverse stroke, and the resulting direction of rotation of the target rod.

FIG. 10 shows an actuator and a rod.

In FIG. 15A, spring stiffness is kept constant for each of the mass-spring resonant pairs, but the mass is varied. In FIG. 15B, mass is kept constant for each of the mass-spring resonant pairs, but the spring stiffness is varied.

The above Figures show some illustrative implementations of this invention, or provide information that relates to those implementations. However, this invention may be implemented in many other ways.

DETAILED DESCRIPTION

In exemplary implementations, this invention includes a closely packed array of threaded rods or rods. The threaded rods have the same thread pitch (linear axial spacing between thread teeth) and are held together in close parallel arrangement. The thread teeth of adjacent rods engage with each other. A target rod in the bundle is caused to rotate about its longitudinal axis. Rods that are adjacent to the target, rotating rod act as a composite "nut" to the rotating rod.

Figure 1:
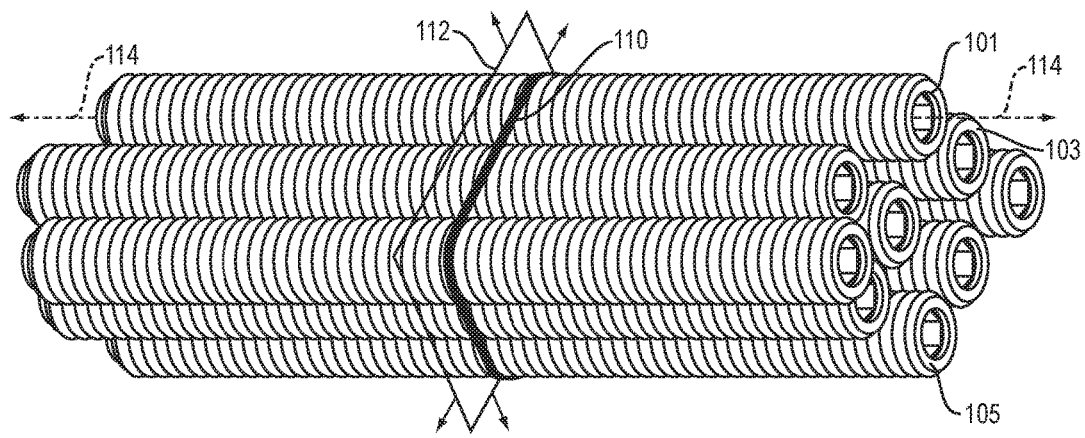
FIG. 1 shows a set of rods. The rods comprise helically threaded rods, and are closely packed together.

FIG. 1 shows a set of rods. The rods (e.g., 101, 103, 105) comprise helically threaded rods, and are closely packed together.

Figure 2:
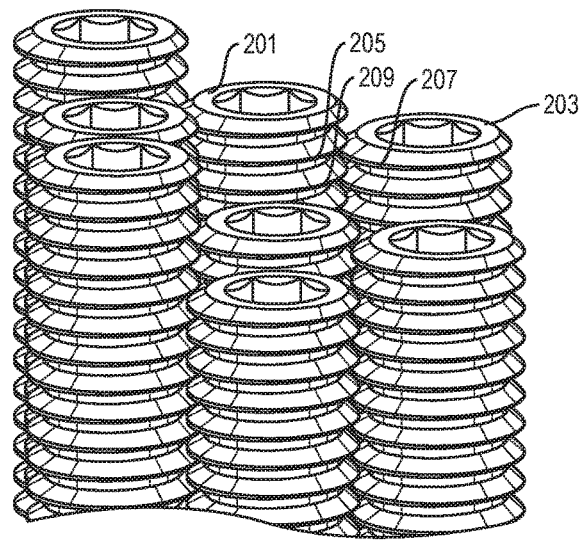
FIG. 2 shows helical thread engagement between adjacent rods of equal thread pitch length.

FIG. 2 shows helical thread engagement between adjacent rods. For example, portion 207 of a thread of rod 203 is positioned between and touching portions 205 and 209 of a thread of rod 201.

In exemplary implementations, if a rod is rotating, the friction it applies to the immediately adjacent rods results in a rotation moment being applied to those adjacent rods. If one rod rotates, the rods around it may start to turn as well.

In exemplary implementations, the array of rods is preloaded by pressing the rods together from the outer edges. The preloading increases the friction between the rod elements and reduces undesirable interaction between rods.

In exemplary implementations, the interlocking threads of two adjacent rods strongly resist rotating in the same direction because of the physical interference of the threads. In some cases, this "thread-locking" effect is used as a nonlinear property to isolate induced moments to the array and to prevent undesired rotations.

Which rod thread profile shape and arrangement is used can alter system characteristics. For example, a doubly or triply threaded rod increases the linear distance a rod travels when it undergoes a rotation (as compared to a singly threaded rod). Different thread/linear distance ratios can change the drive efficiency and transmission ratio. The shape of the thread also affects system performance. For example, a ball-screw threaded rod with spherical edges may reduce the friction between touching rods because the contact between the rods is a point contact, rather than an area contact (as in many other types of rods). In some implementations, ball bearings between adjacent ball-screw threaded rods may be used to further reduce the sliding contact friction between rods to a rolling contact friction.

The packing arrangement of the rod elements has a strong effect on how forces and displacements are transmitted throughout the array. Two examples of rod packing are illustrated in FIGS. 3A and 3B below.

Figure 3A:
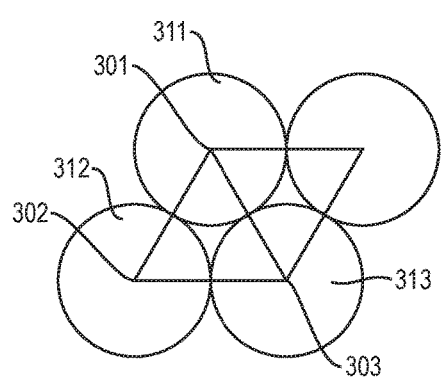
FIG. 3A shows a triangular/hexagonal packing arrangement for rods.

FIG. 3A shows a triangular/hexagonal packing arrangement for rods.

This arrangement is sometimes called a triangular packing arrangement because it forms triangles. For example, a triangle is formed by vertices 301, 302, 303. These three vertices 301, 302, 303 are at the centers of rods 311, 312, 313. This packing arrangement is also sometimes called a hexagonal packing arrangement, because it results in hexagonally shaped sets of seven rods (e.g., rods 401, 402, 403, 404, 405, 406, 407 in FIG. 4).

Figure 3B:
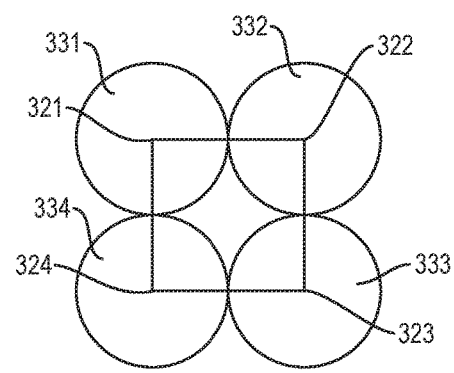
FIG. 3B shows a square packing arrangement for rods.

FIG. 3B shows a square packing arrangement for rods. For example, a square is formed by points 321, 322, 323, 324. These points 321, 322, 323, 324 are at the centers of rods 331, 332, 333, 334.

As shown in FIGS. 3A and 3B, the interstitial space between rods in the square packing is larger than the area between rods in the hexagonal packing. Thus, the hexagonal packing is denser than square packing and has a higher resolution than square packing.

However, in many cases, square packing is used rather than hexagonal packing, because in many cases (1) rod elements in the array can be displaced more easily with square packing than hexagonal packing, and (2) force propagation (from rod to rod within the array of rods) can be more energy efficient (and computationally simpler to model) in square packing than hexagonal packing.

Figure 4A:
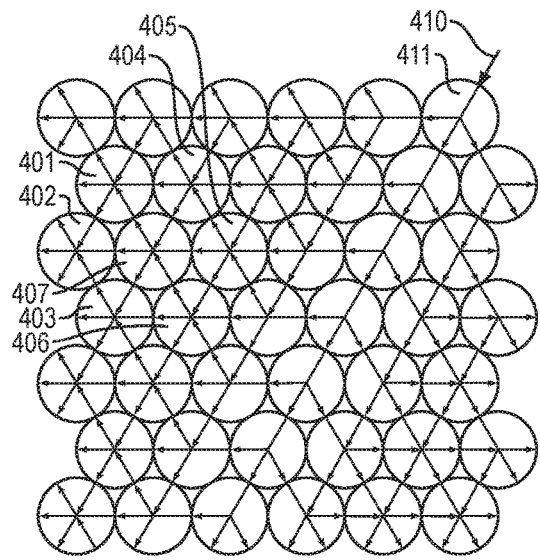
FIG. 4A shows force propagation pattern resulting from a single inward edge perturbation in a hexagonal packing arrangement of rods.
Figure 4B:
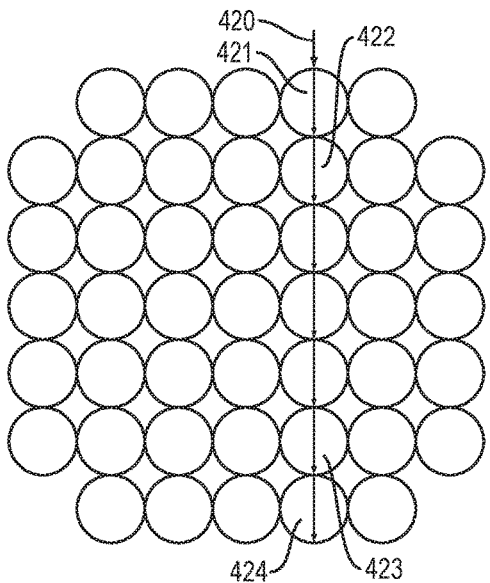
FIG. 4B shows the force propagation pattern in a square packing of rods with a similar edge perturbation.

As shown in FIGS. 4A and 4B, an array with square packed pins has, initially, a clean, linear force propagation and is well suited for targeting individual rod sites from the edges of the array. Similar targeting is achievable with a hexagonal array, but is more energy intensive and, computationally, more difficult to model.

FIG. 4A shows force propagation in a hexagonal packing of rods. An input force (represented by arrow 410) is applied to rod 411. Rod 411 is located on the periphery of the bundle of rods. The other arrows in FIG. 4A represent force propagating throughout the array, directly or indirectly from rod 411. In the example shown in FIG. 4A, hexagonal packing results in a quadratically increasing force propagation.

FIG. 4B shows force propagation in a square packing of rods. An input force (represented by arrow 420) is applied to rod 421. Rod 421 is located on the periphery of the bundle of rods. The other arrows in FIG. 4B represent force propagating throughout the array, directly or indirectly from rod 421. In the square packing of rods shown in FIG. 4B, force propagates along a line of rods (including rods 421, 422, 423, 424). Square packing force propagation is linear along rows and columns.

In exemplary implementations, one or more selected rods in an array of rods are rotated by displacements of rows and columns of rods in the array. These displacements are caused by actuators that are located on the periphery of the array, adjacent to the rows and columns of the array. The displacements include a forward displacement (forward stroke) and a reverse displacement (reverse stroke).

Figure 5A:
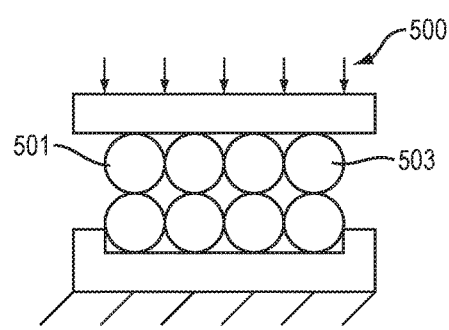
FIGS. 5A, 5B, and 5C together illustrate asymmetric properties of forward displacement and return stoke under a constant downward preloading force.

FIG. 5A shows rods in a square packing, before the rods are displaced. The rods in the square-packed array (e.g., 501, 503) are subject to a preload force (represented by arrows 500).

Figure 5B:
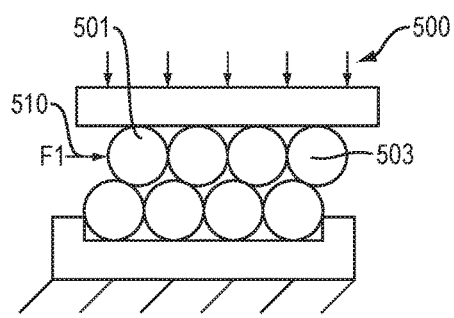

FIG. 5B shows forward displacement of a row of rods. In the example shown in FIG. 5B, the forward displacement comprised the rods in the top row (e.g., rods 501, 503) moving to the right (due to force F1, which is indicated by arrow 510) and down (due to the preload force 500). In FIG. 5B, the forward displacement has already occurred.

Figure 5C:
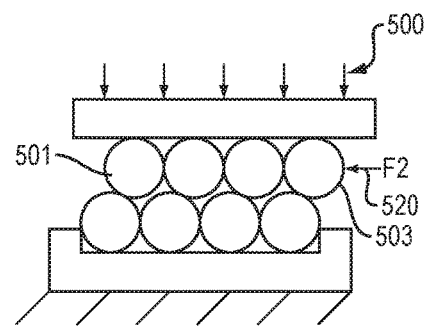

FIG. 5C shows reverse displacement of the row of rods. In the example shown in FIG. 5C, a force (represented by arrow 520) is being applied to the rods in the top row (e.g., rods 501, 503). This will cause the rods in the top row to move to the left and up (due to force F2, which is indicated by arrow 510). In FIG. 5C, the reverse displacement has not yet occurred.

In the example shown in FIGS. 5A, 5B, 5C, the force required for the forward displacement is less than for the reverse direction. This is due, at least in part, to the fact that the forward displacement includes a down component that is actuated by and in the same direction as preload force 500, whereas the reverse displacement includes an up component that is against (and in the opposite direction as) preload force 500.

In the example shown in FIGS. 5A, 5B, and 5C (in which the rods are initially in a square-packed arrangement, before the forward and reverse strokes) a linear dislocation of a row or column causes those rods to move slightly inwards, being pushed by the edge preload force and sinking into a lower energy state. The return displacement, to return those rods to their original position, requires more force than the initial dislocation. This is an advantageous nonlinearity: more tangential friction occurs in a returning-stroke than in a forward stroke. Illustrated in a simplified model in FIG. 6, the initial force F1 pushes the circles down into a lower energy state. As long as there is a preload force on these elements, the magnitude of F1 is lower than the magnitude of the return stroke, F2. F1 lowers the normal force applied to the row, whereas F2 serves to add to that normal force, thereby increasing the friction applied to adjacent rods during F2.

In some implementations, a fast dislocation of a row, followed by a slow return stroke to the initial position, generates unequal tangential forces on adjacent rods, due to the stick-slip phenomenon. (Without being limited by theory, some people believe that the stick-slip phenomenon occurs because the value of the coefficient of static friction is greater than the coefficient of kinetic friction).

Figure 6:
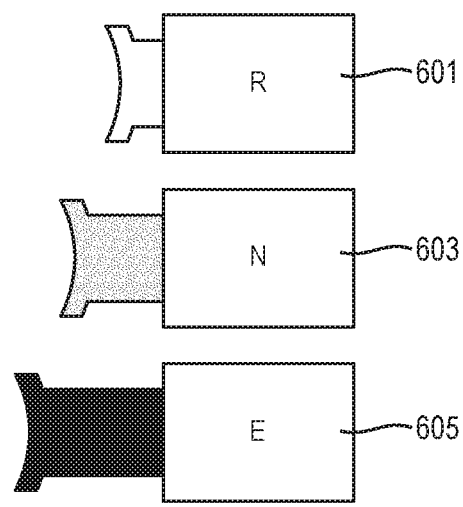
FIG. 6 shows actuators in retracted, neutral and extended positions, respectively.

In exemplary implementations, actuators are located along the perimeter of an array of rods, and each actuator can be used to actuate displacement of a row or column of rods in the array. Each actuator can be in a retracted position, neutral position, or fully extended position. These three positions are shown in FIG. 6: actuators 601, 603, 605 are in a retracted, neutral and extended positions, respectively. The notation for these positions in FIG. 6 ("R" for retracted, "N" for neutral and "E" for extended) is also used in FIGS. 7 and 8. In addition, the actuators can also be in any other position between retracted and fully extended.

Figure 7:
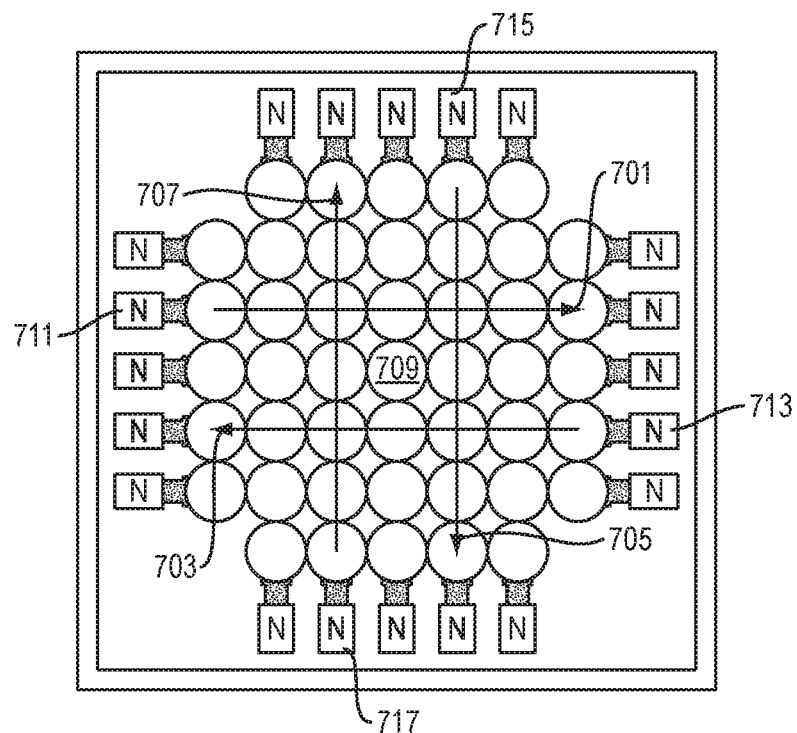
FIGS. 7 and 8 show an example, in which a forward displacement and a reverse displacement cause a target rod to rotate.
Figure 8:
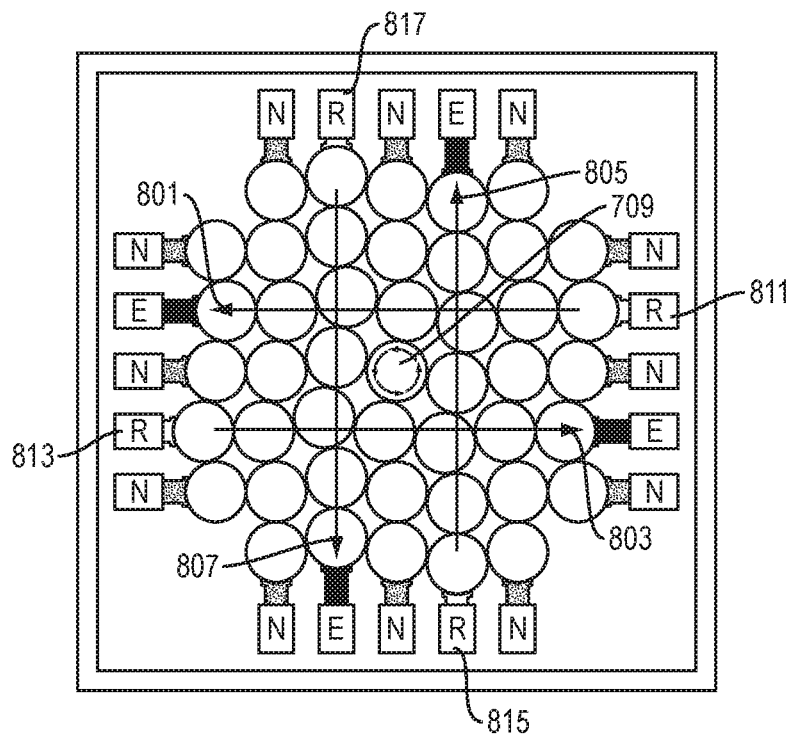

FIGS. 7 and 8 show an example, in which a forward displacement followed by a reverse displacement causes a target rod to rotate during the reverse displacement. In the example shown in FIG. 7, the forward displacement has not yet occurred and the array of rods is still in a square-packed arrangement. In FIG. 7, arrows 701, 703, 705, 707 indicate the direction in which the forward displacement will occur, which is the same as the direction of force that will be applied by actuators 711, 713, 715, 717 to cause the forward displacement. A target rod 709 is adjacent to, and surrounded by, the rows and columns of rods that will be moved in the forward displacement.

FIG. 8 shows the direction of the reverse stroke, and direction of rotation of the target rod. In the example shown in FIG. 8, the reverse stroke has not yet occurred and the array of rods is in an "off kilter" arrangement which is the result of the forward stroke. In FIG. 8, arrows 801, 803, 805, 807 indicate the direction in which the reverse stroke will occur, which is the same as the direction of force that will be applied by actuators 811, 813, 815, 817 to cause the reverse stroke. The target rod 709 is adjacent to, and surrounded by, the "off-kilter" rows and columns of rods that will be moved in the reverse stroke. In the example shown in FIG. 8, the target rod rotates in a counterclockwise direction during the reverse stroke.

In the examples shown in FIGS. 7 and 8: (a) the rods are arranged in rows and columns (which are somewhat "off kilter" in FIG. 8); and (b) a set of actuators is positioned on the periphery of the array of rods, such that an actuator is located at each end of each row and column in the array of rods. Put differently, an actuator is located at every row and column edge site.

FIG. 7 shows an example of movements of rows and columns to select a specific rod for rotation. In order to rotate a rod counter-clockwise, a clockwise collective translation is applied to the rods surrounding the selected rod during the forward stroke and the rotation of the selected rod occurs during the reverse stroke. (The reverse stroke returns the bundle of rods to its initial square-packed configuration.)

Simply having uneven opposite tangential forces on all sides of the targeted rod does not guarantee the rod's rotation. If the four rods applying forces to the targeted rod are always rolling against the targeted rod (without slipping), the uneven forward/return forces do not make a difference to the targeted rod's overall rotation. A rotation can be generated when these four rods slip against the targeted rod. Slipping can be encouraged by reducing friction, preload forces or making the forward, dislocating stroke as fast as possible, utilizing the stick-slip effect.

In exemplary implementations, tangential forces are being applied to all the adjacent rods to a dislocating row, not to the targeted rod only. However, a "thread locking" effect (discussed above) discourages these adjacent rods from rotating and causing an undesired rotation. Only the center, targeted rod has the same direction of tangential friction applied from all four adjacent rods, causing it to rotate incrementally. In some cases, if undesired rotations still do occur, the edge preload is used as a filter and increased up to the point where only the targeted rod rotates (because the targeted rod is subjected to stronger forces than the other rods are subjected to).

In exemplary implementations: (a) each vibration consists of a forward stroke and a reverse stroke; and (b) stick-slip motion occurs during each vibration.

In exemplary implementations, the forward stroke is a "slip" stroke, during which the perturbed rods slide along the adjacent rods with a high enough acceleration to not cause any rotation (roughly analogous to pulling a tablecloth out from under a table, but leaving the dishes in place, in this analogy, the dishes are the adjacent rods).

In exemplary implementations, the return stroke is a "stick" stroke during which more torque is applied to the adjacent rods (than in the forward stroke) due to increased friction force from the collapsing lattice effect. The return stroke occurs at a lower acceleration (than in the forward stroke), so the forward stroke is fast, the return stroke is slow. The actuators are programmed to have this asymmetric sawtooth-like acceleration profile.

In exemplary implementations, rotation of the target screw in an opposite rotational direction is done by reversing the pattern direction. For example: If, in FIG. 7, the arrows showing the direction of movement were reversed, and the rows/columns of dislocated rods moved in the opposite direction as they do in FIG. 8, the rod in the center would turn clockwise on the return stroke instead of counter-clockwise.

In exemplary implementations, both slip and stick occur, and together they cause net rotational motion of the targeted rod. In exemplary implementations, if moving rods slip in both directions, then a target rod that is adjacent to them will not rotate, but if the rods 'stick' in both directions, then the target rod would rotate forward, then rotate back by the same amount, resulting in zero net motion.

In exemplary implementations, "slip" occurs when the rods rub up against each other but don't rotate. In such circumstances, linear motion of the dislocated rod row/column is not transmitted into rotation of the targeted rod, due to insufficient friction to overcome both the inertial mass of the targeted rod and the preload force from the other adjacent rods. The increased force on the return stroke (from the collapsing lattice effect) can cause sticking to occur (roughly analogous to putting bags of sand on a car trunk when the car's tires are slipping in snow). Slower motion on the return stroke also helps to rotate the targeted rod because at lower accelerations, there is less inertial force resistance the motion (as can be predicted by Newton's Second Law, F=ma, the lower the acceleration of a given mass, the less force resisting from the given mass).

In a prototype of this invention, four piezoelectric linear vibrating parts feeders, Model PEF-L125A, have been modified to mate with the edge rods of a spring preloaded square lattice of ⅜-16 alloy steel machine rods. The unloaded linear vibrators displace a maximum of approximately 0.5 mm when tuned to their resonant frequency.

Figure 9:
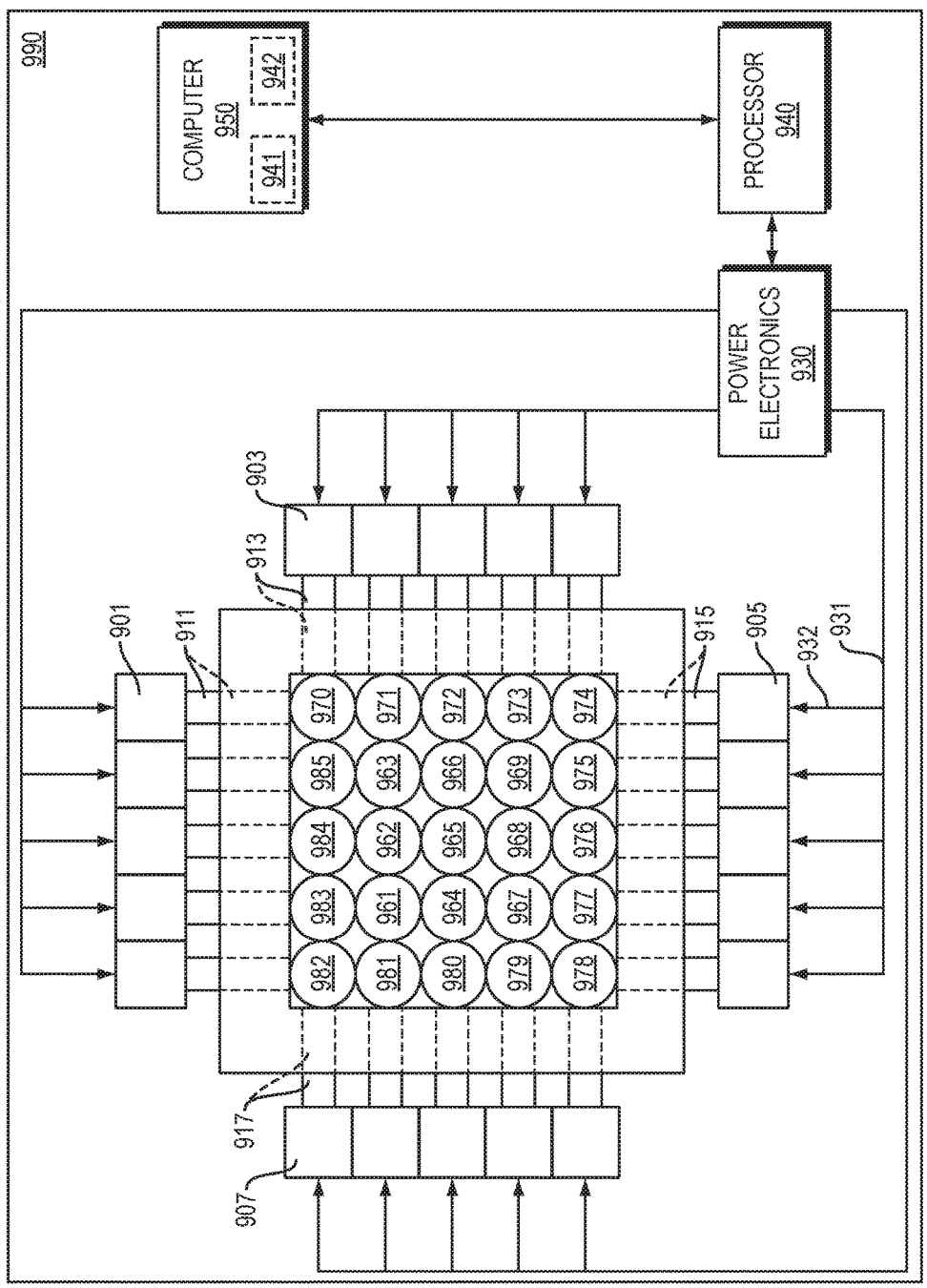
FIG. 9 shows hardware components of a system for selective rod actuation.

FIG. 9 shows hardware components of a system for selective rod actuation. In the example shown in FIG. 9, twenty linear actuators (e.g., 901, 903, 905, 907) are positioned along the perimeter of an array of twenty-five, closely-packed, threaded, elongated rods (rods 961 to 985). In the example shown in FIG. 9, the rods are aligned vertically and are seen from above. The actuators drive vibrations in rods in the perimeter of the array, via connections (e.g., 911, 913, 915, 917). For example, in some cases, these connections may be parts of the actuators themselves (e.g., moveable parts), which parts are adjacent to the perimeter rods and push against perimeter rods. Power electronics 930 drive the actuators (e.g., 901, 903, 905, 907) via wired connections (e.g., 931, 932). An electronic processor (e.g., a microcontroller, integrated circuit or field programmable gate array) 940 controls the actuators. The processor 940 may be housed separately from a computer 950, as shown in FIG. 9, or inside a computer. The computer 950 may be used for, among other things, computing system parameters when designing a particular embodiment of this invention.

In some implementations, the actuators include (or are connected or adjacent to) springs. Advantageously, in some cases, the springs apply a preload force to rods on the perimeter of the array of rods. As a result, the actuators do not need to be continuously on in order to apply the preload force.

In some implementations, each actuator comprises a spring-biased solenoid, in which the solenoid pulls or pushes (only one or the other, depending on the design) against a matched spring. Since the solenoid can only push/pull in one direction, the spring is needed to return the solenoid plunger back to its starting position when power is disconnected from the solenoid.

In some instances, springs are not used. For example, other linear actuators, such as a voice coil (speaker) actuator can move forward and backwards under power, so a spring return isn't necessary for operation of such an actuator.

FIG. 10 shows an actuator and a rod. In the example shown in FIG. 10, the rod 1003 is located on the perimeter of an array of rods. A linear actuator 1001 is connected to the rod 1003 by a movable part 1002. Motion of the moveable part 1002 is constrained by a linear guide or linear bearing 1005, such that the moveable part moves in straight line.

In some implementations, a mechanical guide constrains the motion of a linear actuator. In some but not all cases, the actuator has an integrated linear guide.

In exemplary implementations, vibrations of rods are caused by the actuators themselves. In some alternative implementations, the actuators themselves are vibrated by some other source of motion.

In some implementations, an actuator (e.g., a linear actuator) does not itself move while the actuator induces motion in another object. For example, in some cases, an AC current drives an electromagnet to cause vibrations in an adjacent piece of metal.

Depending on the particular implementation, either periodic or aperiodic motion can be used to move a rod. For example, in some cases, if a single pair of actuators fires a single time or fires at constantly changing intervals, the motion is aperiodic, and a rod can still be moved a small distance this way. If a single pair of actuators fires several times at regular intervals, the motion is periodic.

In exemplary implementations, actuators on the perimeter of the array are characterized by small displacement, high force, and high bandwidth motion.

In some implementations, the actuators comprise electromagnetic actuators, such as spring biased solenoid coils, Lorenz voice coil actuators or AC inductive coils. In some cases, these electromagnetic actuators are used for frequency modulation as well as amplitude modulation, and provide a unique displacement output.

Alternatively, piezoelectric actuation is used. In some cases, the piezoelectric actuators have high efficiency, high force and high frequency output.

In some alternative implementations, an eccentric weight is attached to a rotating motor and provides vibration input (but in some cases, this eccentric weight technique only allows for frequency modulation, not dynamic amplitude adjustments).

The number and diameter of rods in the array of rods can vary, depending on the particular implementation of this invention.

Figure 11A:
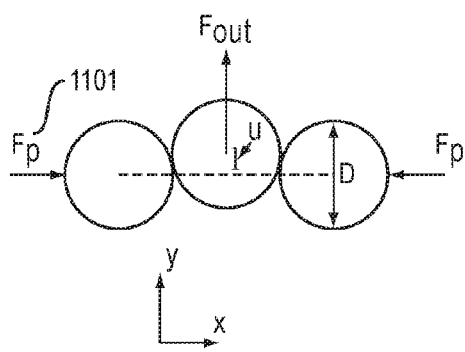
FIGS. 11A and 11B are free body diagrams that show forces during a forward displacement.
Figure 11B:
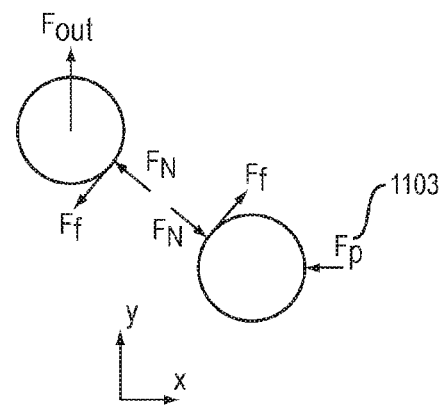
Figure 11C:
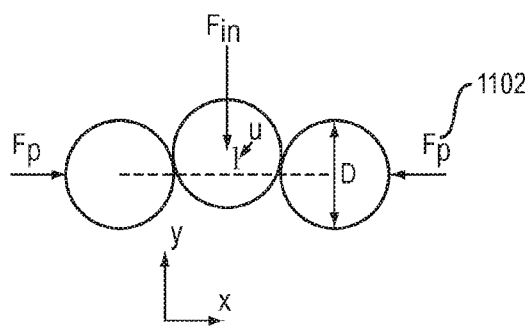
FIGS. 11C and 11D are free body diagrams that show forces during a reverse displacement.
Figure 11D:
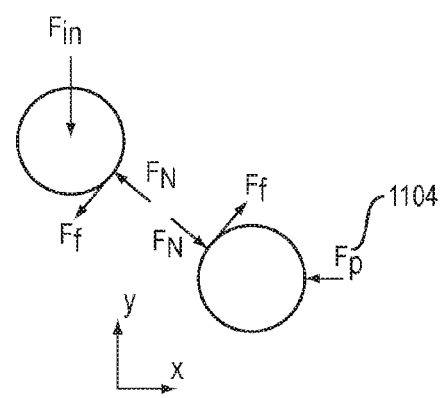

FIGS. 11A and 11B are free body diagrams that show forces during a forward displacement. FIGS. 11C and 11D are free body diagrams that show forces during a reverse displacement. In the examples shown in FIGS. 11A, 11B, 11C and 11D: (a) force $F_p$ (e.g., 1101, 1102, 1103, 1104) is a constant edge-applied preload; (b) u and D are the displacement and diameter, respectively, of the central, targeted rod; (c) $F_N$ is normal force between rods; and (d) $F_f$ is contact friction.

In some implementations, forces are applied to a single target rod during a row/column dislocation, driven by force Fout and, in the case of the return stroke, driven by Fin. These forces are shown in FIGS. 11A, 11B, 11C and 11D.

In FIGS. 11A, 11B, 11C and 11D, the x direction is horizontal and positive pointing to the right of the page and the y direction is vertical and positive pointing to the top of the page. In the following equations (and in the equations in FIG. 14), an x subscript indicates an x-axis component of a force, and a y subscript denotes a y-axis component of a force.

The forces shown in FIGS. 11A, 11B, 11C and 11D can be mathematically analyzed as follows:

First, solve for Fout.

To start, sum the y-axis components of force Fout:

$$F_{out} = F_{f_y} - F_{N_y} \quad \text{(Eq. 1)}$$

$$F_{out} = \frac{F_f \sqrt{(D^2 - u^2)}}{D} - \frac{F_N u}{D} \quad \text{(Eq. 2)}$$

$$F_{out} = \frac{\mu F_N \sqrt{(D^2 - u^2)}}{D} - \frac{F_N u}{D} \quad \text{(Eq. 3)}$$

where μ is the coefficient of friction of the rod surfaces.

Now, find $F_N$ in terms of $F_p$:

$$F_p = F_{N_x} + F_{f_x} \quad \text{(Eq. 4)}$$

$$F_p = \frac{F_N \sqrt{(D^2 - u^2)}}{D} + \frac{F_f u}{D} \quad \text{(Eq. 5)}$$

$$F_p = \frac{F_N \sqrt{(D^2 - u^2)}}{D} + \frac{\mu F_N u}{D} \quad \text{(Eq. 6)}$$

$$F_N = \frac{F_p}{\frac{\sqrt{(D^2 - u^2)}}{D} + \frac{\mu u}{D}} \quad \text{(Eq. 7)}$$

Plug equation 7 into equation 3:

$$F_{out} = \frac{\mu \frac{F_p}{\frac{\sqrt{(D^2 - u^2)}}{D} + \frac{\mu u}{D}} \sqrt{(D^2 - u^2)}}{D} - \frac{\frac{F_p}{\frac{\sqrt{(D^2 - u^2)}}{D} + \frac{\mu u}{D}} u}{D} \quad \text{(Eq. 8)}$$

Algebraic simplification of Equation 8 gives equation 9, the force relationship between the dislocated rod, the preload, the coefficient of friction, the diameter of the rod and the displacement magnitude.

$$F_{out} = \frac{F_p (\mu \sqrt{(D^2 - u^2)} - u)}{\sqrt{(D^2 - u^2)} + \mu u} \quad \text{(Eq. 9)}$$

Now, multiply Equation 9 by 2n. Reason: Equation 9 is only half the force of one rod. Multiplying by a factor of two gives the relationship for a single rod. In order to estimate the total force on the row, the equation is also multiplied by n, the number of rods in that row. Thus, $$F_{out} = \frac{n * 2 F_p (\mu \sqrt{(D^2 - u^2)} - u)}{\sqrt{(D^2 - u^2)} + \mu u} \quad \text{(Eq. 10)}$$

Figure 12A:
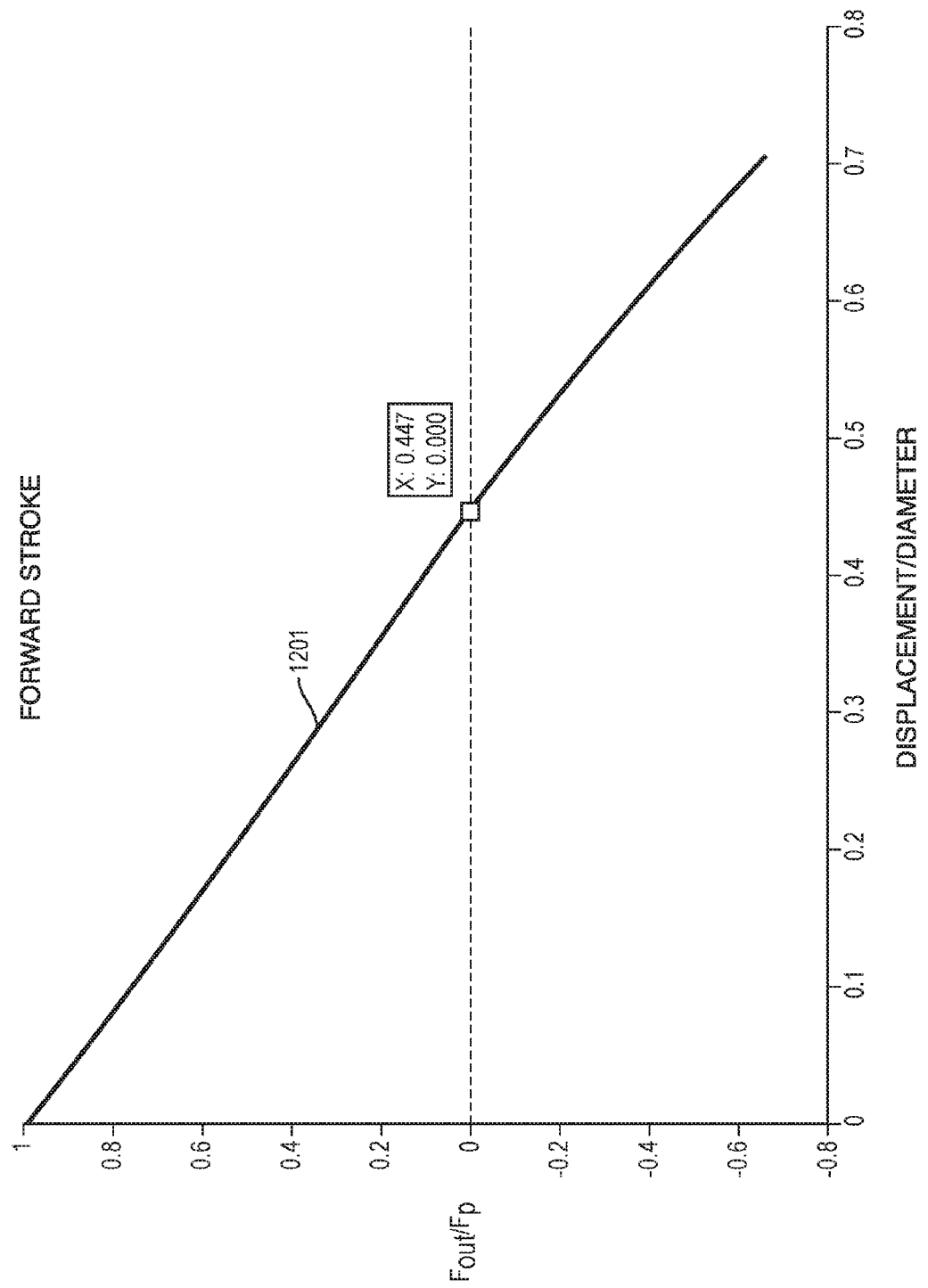
FIG. 12A shows, for a forward displacement of a single rod, a graph of a force ratio versus a distance ratio.

FIG. 12A plots Fout/Fp against u/D to provide a rough dimensionless comparison of how the forces scale with displacement. The graph in FIG. 12A assumes a friction coefficient of 0.5; increasing the coefficient of friction will translate the graph upwards, lowering the zero point plotted below. The graph in FIG. 12A does not include the factor of n for the number of rods being considered in a row or column. The graph, FIG. 12A, considers the forces on a single rod only.

FIG. 12A shows, for a forward displacement of a single rod, a graph 1201 of a force ratio (the edge preload force/forward displacement force) versus a distance ratio (displacement of rod/diameter of rod).

In the example shown in FIG. 12A, the dislocation force of a single rod is at maximum equal to the preload force. Also, in the example shown in FIG. 12A, when the dislocation of the rod element is about 44.7% of the rod's diameter, the force of the preload reverses direction and actually helps to push the rod further along the direction of displacement. This may not be desirable, depending on how much dislocation is allowed in the system, because reaching this point might cause a row to fully collapse into hexagonal packing.

Next, solve for the return stroke force, $F_{in}$.

First, sum the y-axis components of force $F_{in}$.

$$F_{in} = F_{f_y} + F_{N_y} \quad \text{(Eq. 11)}$$

$$F_{in} = \frac{F_f \sqrt{(D^2 - u^2)}}{D} + \frac{F_N u}{D} \quad \text{(Eq. 12)}$$

$$F_{in} = \frac{\mu F_N \sqrt{(D^2 - u^2)}}{D} + \frac{F_N u}{D} \quad \text{(Eq. 13)}$$

Now, find $F_N$ in terms of Fp.

$$F_p = F_{N_x} - F_{f_x} \quad \text{(Eq. 14)}$$

$$F_p = \frac{F_N \sqrt{(D^2 - u^2)}}{D} - \frac{F_f u}{D} \quad \text{(Eq. 15)}$$

$$F_p = \frac{F_N \sqrt{(D^2 - u^2)}}{D} - \frac{\mu F_N u}{D} \quad \text{(Eq. 16)}$$

$$F_N = \frac{F_p}{\frac{\sqrt{(D^2 - u^2)}}{D} - \frac{\mu u}{D}} \quad \text{(Eq. 17)}$$

Plug equation 17 into equation 13.

$$F_{in} = \frac{\mu \frac{F_p}{\frac{\sqrt{(D^2 - u^2)}}{D} - \frac{\mu u}{D}} \sqrt{(D^2 - u^2)}}{D} + \frac{\frac{F_p}{\frac{\sqrt{(D^2 - u^2)}}{D} - \frac{\mu u}{D}} u}{D} \quad \text{(Eq. 18)}$$

Algebraic simplification yields equation 19, the force relationship between the dislocated rod, the preload, the coefficient of friction, the diameter of the rod and the displacement magnitude.

$$F_{in} = \frac{F_p (\mu \sqrt{(D^2 - u^2)} + u)}{\sqrt{(D^2 - u^2)} - \mu u} \quad \text{(Eq. 19)}$$

Now, multiply Equation 19 by 2n. Reason: Equation 9 is only half the force of one rod. Multiplying by a factor of two gives the relationship for a single rod. In order to estimate the total force on the row, the equation is also multiplied by n, the number of rods in that row. Thus, $$F_{in} = \frac{n*2F_p(\mu\sqrt{(D^2-u^2)}+u)}{\sqrt{(D^2-u^2)}-\mu u} \qquad \text{(Eq. 20)}$$

Figure 12B:
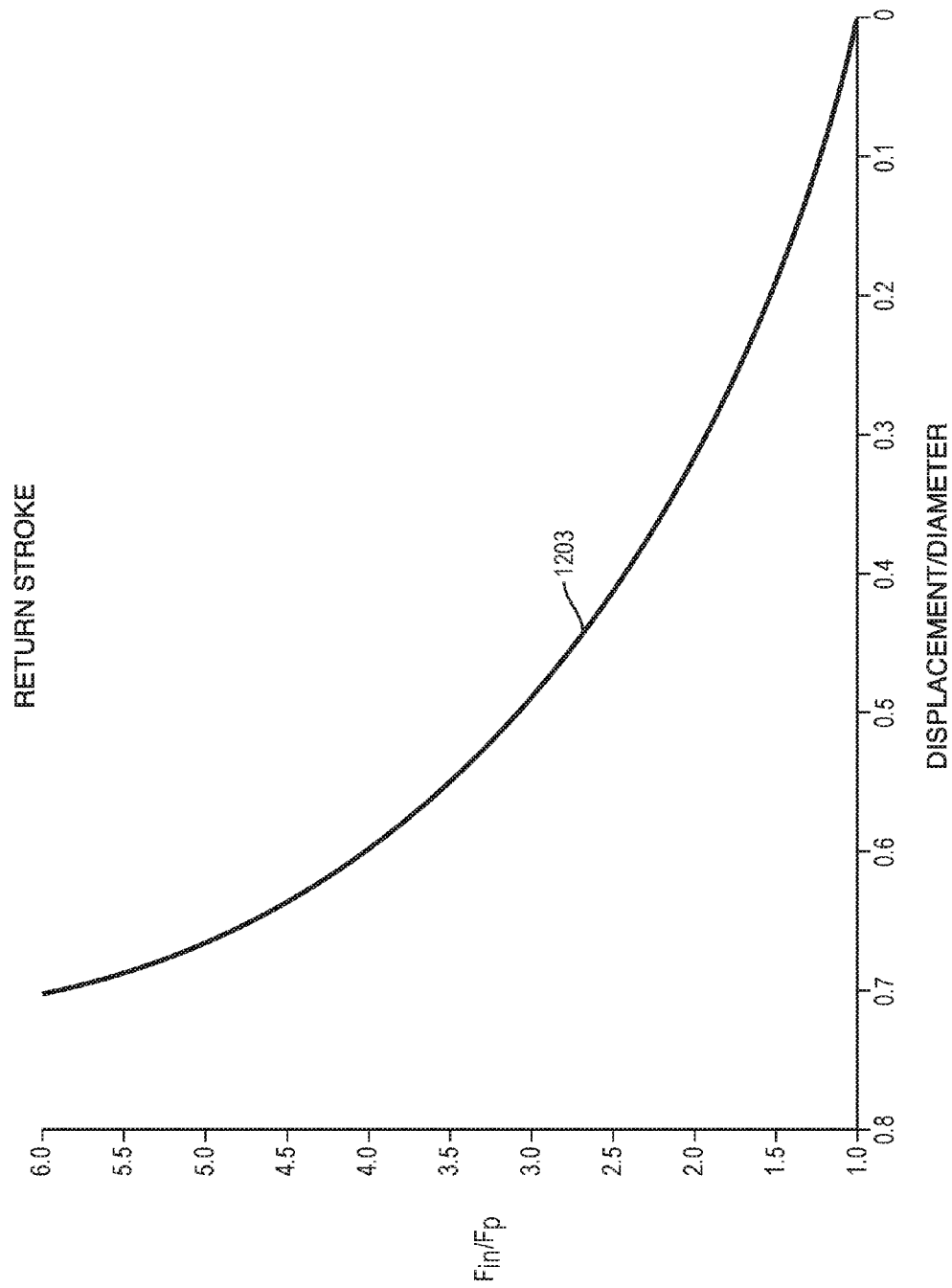
FIG. 12B shows, for a reverse stroke of a single rod, a graph of a force ratio versus a distance ratio.

FIG. 12B plots Fin/Fp against u/D. The graph in FIG. 12B assumes a friction coefficient of 0.5; but increasing the coefficient of friction shows a steeper slope for high displacements, increasing the return force and how quickly it increases with displacement. The graph in FIG. 12B does not include the factor of n for the number of elements being considered in a row or column. The graph, FIG. 12B, compares the forces on a single element only.

FIG. 12B shows, for a reverse stroke of a single rod, a graph 1203 of a force ratio (the edge preload force/reverse displacement force) versus a distance ratio (displacement of rod/diameter of rod).

In the example shown in FIG. 12B, the returning force to reset a single rod element increases sharply starting at displacements around 50% of the rod's diameter. This makes sense, in light of FIG. 12A: the preload ratio in FIG. 12A passes an origin around this same point and becomes negative, acting here in FIG. 12B against the return stroke.

Assuming that a sufficiently strong actuator is used, the maximum possible resolution of the system is affected primarily by the material stiffness and manufacturing tolerance of the rods. Low stiffness or loose tolerance rods can introduce backlash into an actuated row or column and result in poor force propagation for rows with many elements. A small amount of backlash, when summed over many rod elements, could cause a dislocation to "fizzle out" and be prevented from propagating along an entire row or column. In some implementations, these kinds of backlash errors are reduced by increasing the material stiffness of the rods, holding a tighter tolerance or by increasing the magnitude of the dislocation applied. If hard materials are used to make the rods and basic ANSI tolerances are met, this kind of backlash is expected only in arrays with rows or columns on the order of 100 or more rods. In some cases, backlash is reduced by coating the rods with a thin layer of compliant material (like rubber) to help elastically average undesired backlash—this preloads every rod site, not just the perimeter of the array.

Equations 10 and 20 are useful tools for choosing actuators based on a desired displacement, rods based on diameter, and friction properties and preload strength based on actuator strength.

Figure 13:
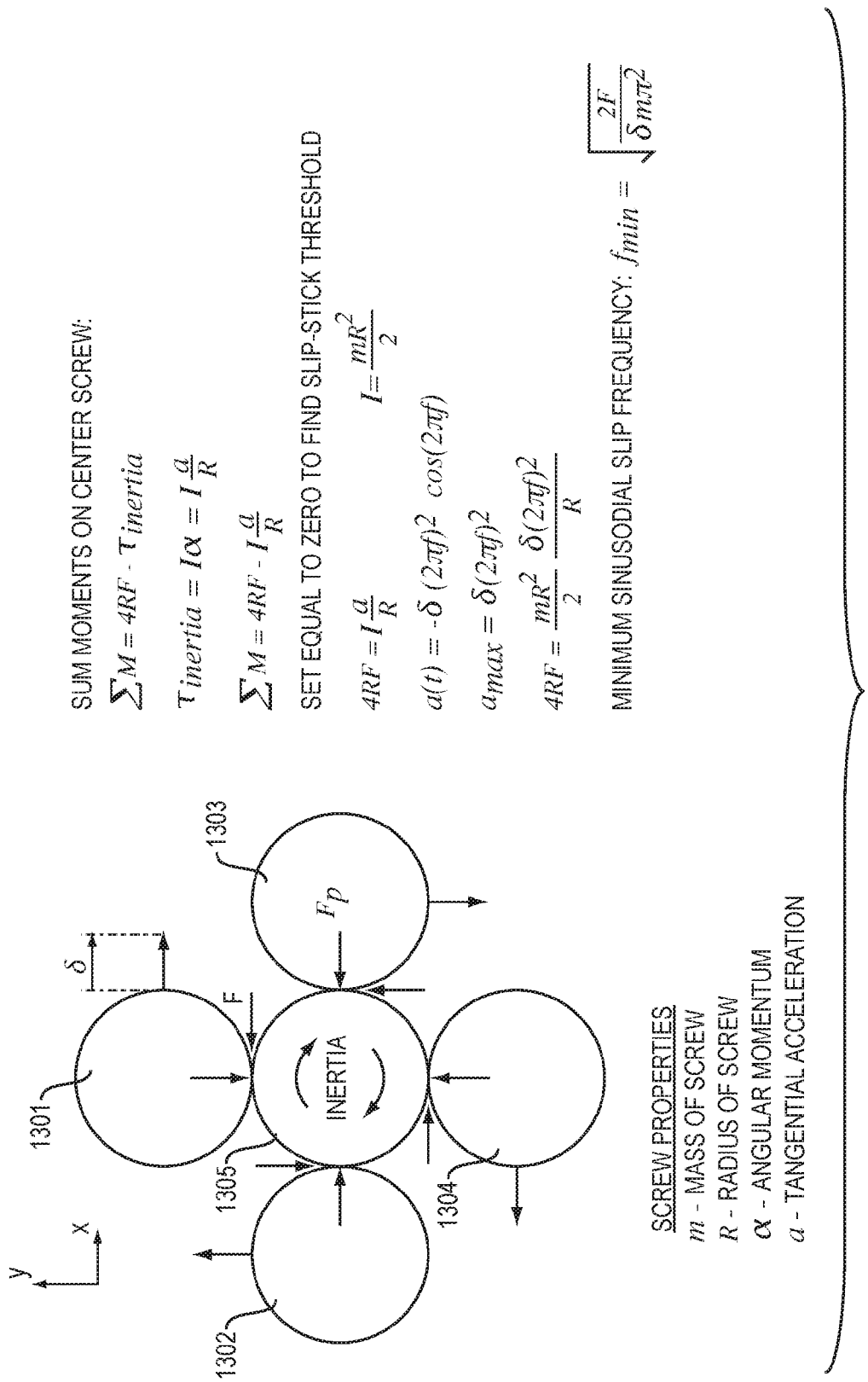
FIG. 13 show steps in calculating a minimum input vibration frequency needed to cause a "slip" in a stick-slip motion of a target rod relative to adjacent rods, based on initial system parameters.

FIG. 13 show steps in calculating a minimum input vibration frequency needed to cause a "slip" in a stick-slip motion of a target rod relative to adjacent rods (1301, 1302, 1303, 1304), based on initial system parameters.

Figure 14:
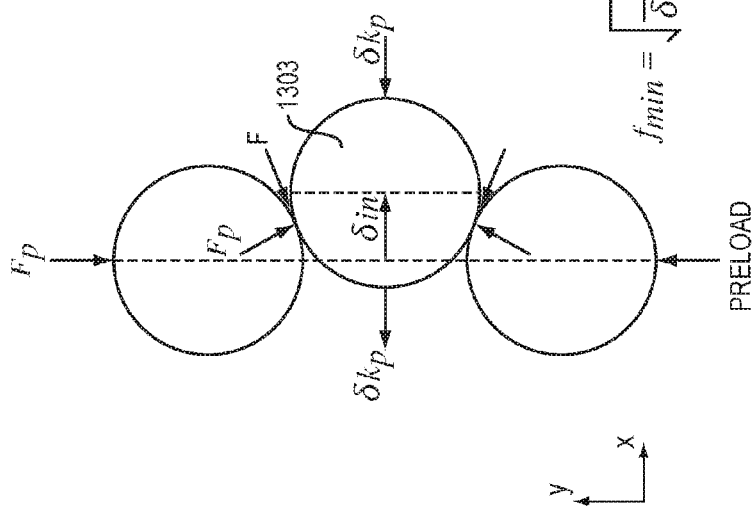
FIG. 14 shows steps in calculating a minimum driving frequency, both for the forward stoke and the return stroke, for slip to occur. The minimum "slip" return stroke frequency is equal to the maximum "stick" return stroke frequency. The calculations in FIG. 14 take into account shifting geometry of the array.

FIG. 14 shows steps in calculating a minimum driving frequency, both for the forward stoke and the return stroke, for slip to occur. The minimum "slip" return stroke frequency is equal to the maximum "stick" return stroke frequency. The calculations in FIG. 14 take into account shifting geometry of the array.

In the examples shown in FIGS. 13 and 14: (a) F is friction force; (b) $\tau_{inertia}$ is the torque of inertia of the center rod; (c) m is the mass of each rod, respectively; (d) R is radius; (e) α is angular acceleration; (f) a is tangential acceleration; (g) I is moment of inertia of the center rod about its longitudinal axis; (h) t is time; (i) $F_p$ is normal force of preload; (j) δ and $\delta_{in}$ are displacements that occur during vibrations; (k) $k_p$ is the preload spring constant; (1) $F_x$ is the x-axis component of friction force F; (m) $F_{px}$ is the x-axis component of the normal force of preload $F_p$; (n) F(in) is a linear force in the direction of the forward stroke; (o) F(ret) is a linear force in the direction of the return stroke, (p) f is frequency; and (q) M is a moment of force (torque) on the center rod.

In the example shown in FIG. 14, f(in) is the forward stroke frequency slip threshold, and f(ret) is the return frequency slip threshold. Put differently, in this example, the f(in) and f(ret) frequencies are minimum frequencies for slip to occur. In this example: (a) when calculated, f(in) and f(ret) are two frequency values (e.g., 40 Hz and 60 Hz); (b) the lower frequency is f(in) and the higher frequency is f(ret); (c) f(in) and f(ret) are the lowest and highest values, respectively, of the frequency range in which the device operates, in order to have slip in the forward stroke and stick in the return stroke; (d) f(in) and f(ret) are both "minimum" frequencies, but minimum for slip, specifically, and (e) in order to prevent (macro-scale) slip in the reverse stroke, f(ret) is a maximum operating frequency for the system, along with being the minimum slip frequency on the return stroke.

Alternative Embodiments:

This invention may be implemented in many different ways, in addition to those described above. Here are some non-limiting examples.

In some alternative implementations, a set of tuned resonators selectively drive different edge sites from a single varying multi-frequency input. (The different edge sites are different rods on the periphery of the array of rods.) Different mass/spring property resonators are attached to the same vibrator (e.g., a piezoelectric vibrator). By running the vibrator at different frequencies; one or more resonators are be selectively triggered when the input signal matches a resonator's natural frequency.

For example, in some cases, a linearly oscillating plate is connected to a set of different outputs via a set of mass-spring links. There is one mass-spring link per output. The different mass-spring links have different natural frequencies. The frequency of the oscillation of the oscillating plate is controllable, such that the frequency of the oscillating plate is changed to match the natural frequencies of different mass-spring links. When a given mass-spring link is driven at its natural frequency, the amplitude of its output increases dramatically.

In these implementations, the natural frequency of a mass-spring resonant pair is controlled in different ways. In the example shown in FIG. 15A, the natural frequency is controlled by keeping the spring stiffness constant and varying the mass of the system (represented by the changing size of the middle block in the figure). In the example shown in FIG. 15B, the natural frequency is controlled by keeping the mass constant and varying the spring stiffness across the outputs (represented by the different widths of spring below the equal masses). Or, alternatively, both spring stiffnesses and masses can be varied, as a superposition of the two approaches.

Figure 15A:
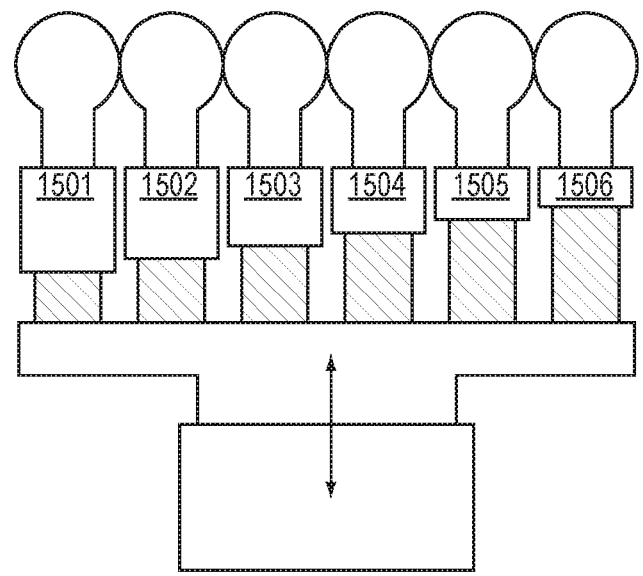
FIGS. 15A and 15B show two different ways to vary the natural frequency of mass-spring resonant pairs attached to an oscillating plate.
Figure 15B:
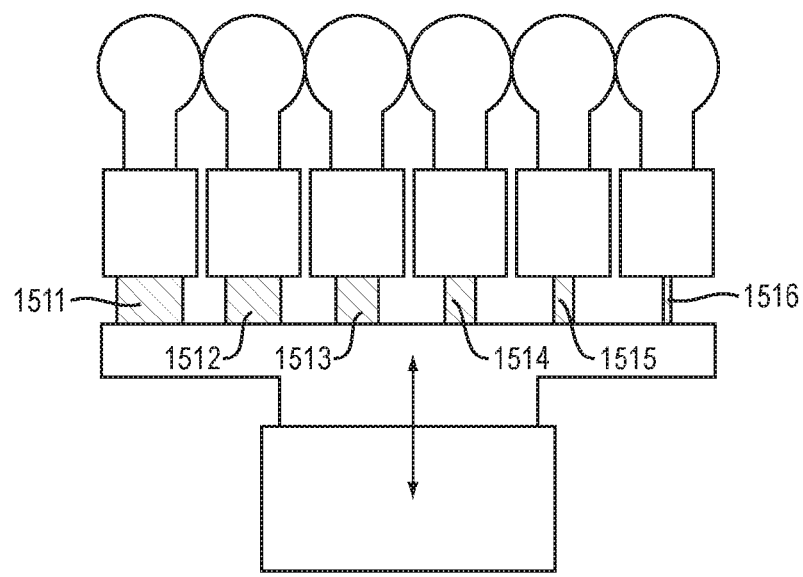

FIGS. 15A and 15B show two different ways to vary the natural frequency of mass-spring resonant pairs attached to an oscillating plate. In FIG. 15A, spring stiffness is kept constant for each of the mass-spring resonant pairs, but the mass is varied. In FIG. 15A, the mass of the respective mass-spring resonant pairs is represented by the size of blocks 1501, 1502, 1503, 1504, 1505, 1506. In FIG. 15B, mass is kept constant for each of the mass-spring resonant pairs, but the spring stiffness is varied. In FIG. 15B, the spring stiffness of the respective mass-spring resonant pairs is represented by the width of springs 1511, 1512, 1513, 1514, 1515, 1516.

In some alternative implementations, a large resonating plate is connected to a row of clutches that can engage and disengage columns of rods to the large vibrating plate. In this alternative approach, the clutches comprise either electrostatic, magnetic, mechanical or another type of clutch.

Figure 16:
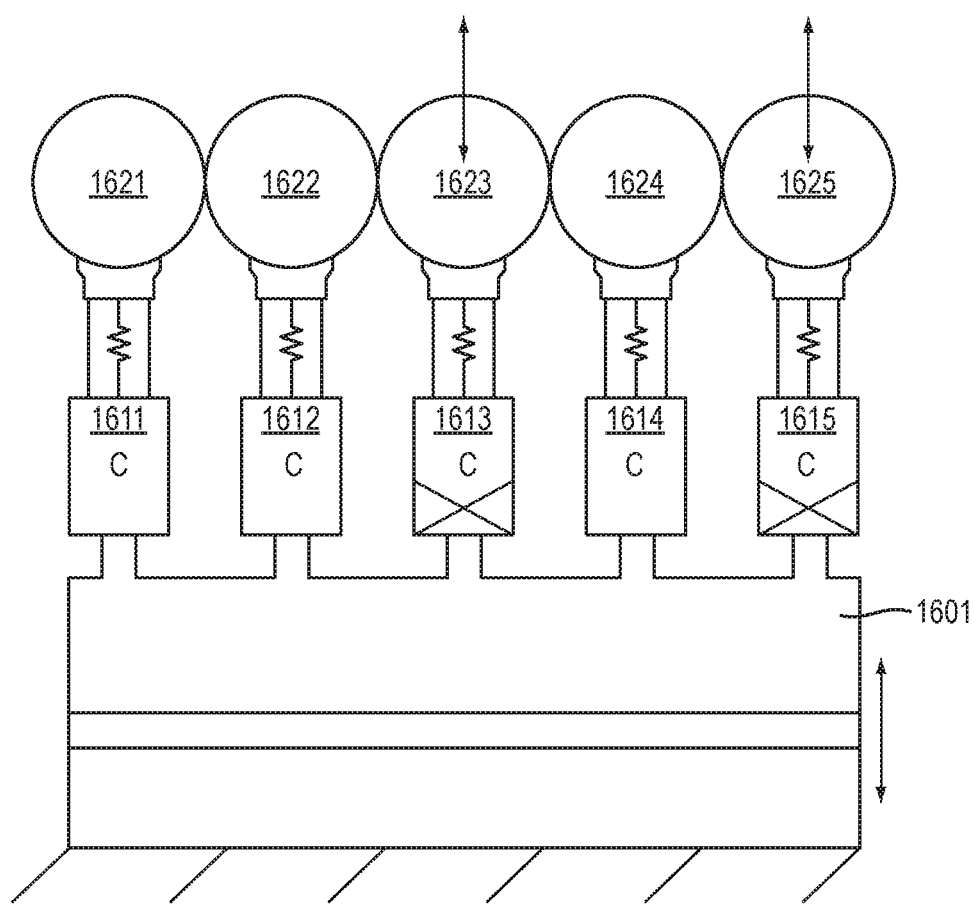
FIG. 16 is a schematic of a large vibrating plate connected to a row of clutches. Each respective clutch engages or disengages the plate to an edge rod.

FIG. 16 shows an example of this alternative approach. In FIG. 16, a large vibrating plate 1601 is connected to a row of clutches 1611, 1612, 1613, 1614, 1615. Each respective clutch engages or disengages the plate to a rod. Each of these rods 1621, 1622, 1623, 1624, 1625 are on the periphery of a bundle of rods. These edge rods 1621, 1622, 1623, 1624, 1625 are each, respectively, at the end of a row or column of rods in the bundle of rods. Displacements imparted to these edge rods are transmitted to these rows or columns of rods. In the example shown in FIG. 16, clutches 1613 and 1615 are engaged, causing displacement of edge rods 1623 and 1625, respectively. The displacement of rod 1623 is, in turn, transmitted to a row or column of rods that includes rod 1623. Likewise, the displacement of rod 1625 is, in turn, transmitted to a row or column of rods that includes rod 1625. An advantage of this alternative approach is that, in some cases, a large mass vibrating plate and small electronic clutches are of a higher force and more inexpensive to produce than many small vibrating actuators.

This invention is not limited to linear actuators. In some cases, the actuators are not linear.

Processors:

In exemplary implementations of this invention, one or more electronic processors (e.g., 940, 941, 942) are specially adapted: (1) to control the operation of, or interface with, hardware components (e.g., any actuator, clutch, or sensor) of a system for selectively actuating rods, (2) to control the reconfiguration of a reconfigurable surface; (3) to receive sensor signals, including feedback regarding the actuation; (4) to perform computations to compute parameters of the system, including forces, torques, and rod diameter; (5) to receive signals indicative of human input; (6) to output signals for controlling transducers for outputting information in human perceivable format; and (7) to process data, to perform computations, to execute any algorithm or software, and to control the read or write of data to and from memory devices. The one or more processors may be located in any position or positions within or outside of the system. For example: (a) at least some of the one or more processors may be embedded within or housed together with other components of the system, such as actuators, and (b) at least some of the one or more processors may be remote from other components of the system. The one or more processors may be connected to each other or to other components in the system either: (a) wirelessly, (b) by wired connection, or (c) by a combination of wired and wireless connections. For example, one or more electronic processors (e.g., processor 941, 942) may be housed in a computer (e.g., computer 950)

In exemplary implementations, one or more computers are programmed to perform any and all algorithms described herein. For example, in some cases, programming for a computer is implemented as follows: (a) a machine-accessible medium has instructions encoded thereon that specify steps in an algorithm; and (b) the computer accesses the instructions encoded on the machine-accessible medium, in order to determine steps to execute in the algorithm. In exemplary implementations, the machine-accessible medium comprises a tangible non-transitory medium. For example, the machine-accessible medium may comprise (a) a memory unit or (b) an auxiliary memory storage device. For example, while a program is executing, a control unit in a computer may fetch the next coded instruction from memory.

Definitions:

The terms "a" and "an", when modifying a noun, do not imply that only one of the noun exists.

The term "array" shall be construed broadly. For example: (a) the rods in an "array" of rods do not need to be arranged in straight lines (e.g., straight rows or straight columns); (b) the rods in an "array" do not need to be arranged in a spatially repeating pattern or a spatially periodic pattern; and (c) the rods shown in FIG. 8 are in an "array".

The term "column" shall be construed broadly. For example, a "column" of rods does not need to be in a straight line.

The term "comprise" (and grammatical variations thereof) shall be construed broadly, as if followed by "without limitation". If A comprises B, then A includes B and may include other things.

The term "computer" shall be construed broadly. For example, the term "computer" includes any computational device that performs logical and arithmetic operations. For example, a "computer" may comprise an electronic computational device. For example, a "computer" may comprise: (a) a central processing unit, (b) an ALU (arithmetic/logic unit), (c) a memory unit, and (d) a control unit that controls actions of other components of the computer so that encoded steps of a program are executed in a sequence. For example, the term "computer" may also include peripheral units, including an auxiliary memory storage device (e.g., a disk drive or flash memory). However, a human is not a "computer", as that term is used herein.

"Defined Term" means a term that is set forth in quotation marks in this Definitions section.

For an event to occur "during" a time period, it is not necessary that the event occur throughout the entire time period. For example, an event that occurs during only a portion of a given time period occurs "during" the given time period.

The term "e.g." means for example.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each can be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

The term "for instance" means for example.

"Herein" means in this document, including text, specification, claims, abstract, and drawings.

The terms "horizontal" and "vertical" shall be construed broadly. For example, "horizontal" and "vertical" may refer to two arbitrarily chosen coordinate axes in a Euclidian two dimensional space, regardless of whether the "vertical" axis is aligned with the orientation of the local gravitational field. For example, a "vertical" axis may oriented along a local surface normal of a physical object, regardless of the orientation of the local gravitational field.

Unless the context clearly indicates otherwise: (1) the term "implementation" means an implementation of this invention; (2) the term "embodiment" means an embodiment of this invention; and (3) the term "cases" means implementations of this invention.

The term "include" (and grammatical variations thereof) shall be construed broadly, as if followed by "without limitation".

The "interior region" of a set of elongated rods (which rods have longitudinal axes that are substantially parallel to each other) means the region consisting of rods that are not immediately adjacent to the perimeter of the set of rods. For purposes of this definition, the perimeter lies entirely in a plane that is substantially perpendicular to the longitudinal axes. For example, FIG. 9 shows an illustrative set of rods, which illustrative set of rods consists of rods 961 to 985. In the example shown in FIG. 9: (a) rods 961, 962, 963, 964, 965, 966, 967, 968, 969 are in the interior region of the illustrative set of rods; and (b) rods 970 to 985 are in the perimeter region of the illustrative set of rods. Also, for example, for the specific set of rods shown in FIG. 1: (a) a portion of a perimeter 110 of the specific set of rods is shown; (b) plane 112 is a plane that is substantially perpendicular to the longitudinal axes of the specific set of rods; (c) perimeter 110 lies entirely within plane 112; and (c) line 114 is the longitudinal axis of rod 101.

The term "or" is inclusive, not exclusive. For example A or B is true if A is true, or B is true, or both A or B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or can be ignored.

The "perimeter region" of a set of elongated rods (which rods have longitudinal axes that are substantially parallel to each other) means the region consisting of rods that are immediately adjacent to the perimeter of the set of rods. For purposes of this definition, the perimeter lies entirely in a plane that is substantially perpendicular to the longitudinal axes. For example, FIG. 9 shows an illustrative set of rods, which illustrative set of rods consists of rods 961 to 985. In the example shown in FIG. 9: (a) rods 961, 962, 963, 964, 965, 966, 967, 968, 969 are in the interior region of the illustrative set of rods; and (b) rods 970 to 985 are in the perimeter region of the illustrative set of rods. Also, for example, for the specific set of rods shown in FIG. 1: (a) a portion of a perimeter 110 of the specific set of rods is shown; (b) plane 112 is a plane that is substantially perpendicular to the longitudinal axes of the specific set of rods; (c) perimeter 110 lies entirely within plane 112; and (c) line 114 is the longitudinal axis of rod 101.

The term "rod" shall be construed broadly. For example, the term "rod" includes: (a) any object that is a cylinder in overall shape; (b) a threaded rod; or (c) any elongated object that is, in overall shape, rotationally symmetric about its longitudinal axis.

The term "row" shall be construed broadly. For example, a "row" of rods does not need to be in a straight line.

As used herein, the term "set" does not include a so-called empty set (i.e., a set with no elements). Mentioning a first set and a second set does not, in and of itself, create any implication regarding whether or not the first and second sets overlap (that is, intersect).

The term "spring" shall be broadly construed and includes any elastic device that stores energy. For example, a "spring" includes any elastic device that stores energy: (a) when compressed, relative to a resting position of the spring, or (b) when extended, relative to the resting position of the spring, the resting position being a position that occurs during a steady state in which no external force is applied to the device.

A "square packing arrangement" of elongated rods means a spatial arrangement of the rods in which, from the perspective of at least one orthographic view: (a) the rods are arranged in a array with straight rows and straight columns that intersect at right angles at intersection points; and (b) for each respective rod, a point in the longitudinal axis of the respective rod coincides with one of the intersection points. FIGS. 3B, 4B, 5A, 7 and 9 each show an example of a square packing arrangement.

The term "stick-slip" motion means motion of a first surface relative to each other, in which the surfaces alternate between (a) sticking to each other and (b) sliding over or past each other, with a corresponding change in friction. During transition from sticking to sliding, acceleration of the two surfaces relative to each other occurs. Likewise, during transition from sliding to sticking, deceleration of the two surfaces relative to each other occurs. In some examples of stick-slip motion, points of the two surfaces that are sticking to each other change over time during a single "sticking" phase. For example, in some circumstances, if the threads of two threaded rods are engaged and at least one of the rods is rotating about its longitudinal axis during a "sticking" phase of stick-slip motion of the two rods relative to each other, then the positions at which the threads stick to each other change over the course of the sticking phase.

As used herein, a "subset" of a set consists of less than all of the elements of the set.

To say that a thing is "substantially constant" means that the thing has a value that can vary, so long as the value is equal to a constant number plus or minus ten percent of the constant number.

A first displacement and a second displacement are "in substantially opposite directions" if the first displacement is in a first direction and the second displacement is in a second direction, and the first and second directions are at an angle relative to each other, which angle is between 170 degrees and 190 degrees.

"Substantially parallel" means within ten degrees of parallel.

"Substantially perpendicular" means within ten degrees of perpendicular.

The term "such as" means for example.

The word "threaded", when modifying a rod, means having threads on an exterior surface of the rod.

The term "vibration" shall be construed broadly. For example, a vibration may be in a single spatial dimension, in two spatial dimensions, or in three spatial dimensions. In some cases, parameters (including equilibrium point, magnitude, frequency and phase) of a "vibration" change over time. For example, the term "vibration" includes: (a) any repetitive back and forth motion; (b) any oscillation, and (c) any periodic or repetitive pattern of motion which repeatedly returns an object to the same point in space.

Unless the context clearly requires otherwise, the terms "apply", "cause", and "transmit" include action at distance or indirectly through one or more intermediaries. For example, unless the context clearly requires otherwise: (a) a force may be "applied" indirectly or through intermediary objects; (b) vibration or oscillation may be "transmitted"

indirectly or through intermediary objects; and (c) causation may be indirect or through intermediaries.

Spatially relative terms such as "under", "below", "above", "over", "upper", "lower", and the like, are used for ease of description to explain the positioning of one element relative to another. The terms are intended to encompass different orientations of an object in addition to different orientations than those depicted in the figures.

Except to the extent that the context clearly requires otherwise, if steps in a method are described herein, then: (1) steps in the method may occur in any order or sequence, even if the order or sequence is different than that described; (2) any step or steps in the method may occur more than once; (3) different steps, out of the steps in the method, may occur a different number of times during the method, (4) any step or steps in the method may be done in parallel or serially; (5) any step or steps in the method may be performed iteratively; (6) a given step in the method may be applied to the same thing each time that the particular step occurs or may be applied to different things each time that the given step occurs; and (7) the steps described are not an exhaustive listing of all of the steps in the method, and the method may include other steps.

This Definitions section shall, in all cases, control over and override any other definition of the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. To the extent that any term or phrase is defined or clarified herein, such definition or clarification applies to any grammatical variation of such term or phrase, taking into account the difference in grammatical form. For example, the grammatical variations include noun, verb, participle, adjective, or possessive forms, or different declensions, or different tenses. In each case described in this paragraph, Applicant is acting as Applicant's own lexicographer.

Variations:

This invention may be implemented in many different ways. Here are some non-limiting examples:

In one aspect, this invention is a method of actuating a target rod, wherein: (a) the target rod is part of a set of threaded, elongated rods, the longitudinal axes of which are substantially parallel to each other; (b) the set of rods has an interior region and a perimeter region; (c) the set of rods includes interior rods that are in the interior region and perimeter rods that are in the perimeter region; and (d) one or more actuators that are connected to a set of perimeter rods induce vibrations in the set of perimeter rods, which vibrations include components that are substantially perpendicular to the longitudinal axes, and which vibrations are transmitted to interior rods, causing a target rod in the interior region to rotate about, and translate along, the longitudinal axis of the target rod. In some cases, the target rod undergoes stick-slip motion relative to rods adjacent to the target rod. Each of the cases described above in this paragraph is an example of the method described in the first sentence of this paragraph, and is also an example of an embodiment of this invention that may be combined with other embodiments of this invention.

In another aspect, this invention is an apparatus comprising in combination: (a) a set of threaded, elongated rods, the longitudinal axes of which are substantially parallel to each other, which set of rods has an interior region and a perimeter region, and which set of rods includes interior rods that are in the interior region and perimeter rods that are in the perimeter region; and (b) one or more actuators for inducing vibrations in a set of perimeter rods, which vibrations include components that are substantially perpendicular to the longitudinal axes, and which vibrations are transmitted to interior rods, causing a target rod in the interior region to rotate about, and translate along, the longitudinal axis of the target rod. In some cases: (a) the set of rods comprises a system; (b) the total energy of the system depends in part on the spatial arrangement of the rods relative to each other; and (c) the total energy of the system is higher when the set of rods is arranged in a square packing arrangement than when the set of rods is in any other arrangement, if all other factors are equal. In some cases, the actuators are adjacent to, or connected to, the set of perimeter rods. In some cases: (a) a single actuator includes, or is adjacent to, a set of multiple mass-spring pairs for driving vibrations of a set of multiple perimeter rods; (b) a first mass-spring pair in the set of mass-spring pairs has a natural frequency of vibration; (c) a second mass-spring pair in the set of mass-spring pairs has another natural frequency of vibration; (d) the first and second mass-spring pairs' natural frequencies are different from each other; and (e) frequency of vibration of the single actuator is adjustable to a set of frequencies, which set of frequencies includes the first and second mass-spring pairs' natural frequencies. In some cases: (a) the apparatus further comprises one or more computers; and (b) the one or more computers are programmed to control the actuators such that the vibrations cause the target rod to undergo stick-slip motion relative to rods that are adjacent to the target rod. Each of the cases described above in this paragraph is an example of the apparatus described in the first sentence of this paragraph, and is also an example of an embodiment of this invention that may be combined with other embodiments of this invention.

In another aspect, this invention is a method of actuating a target rod, wherein: (a) one or more actuators cause oscillations in a first set of rods, which first set of rods comprises one or more rods that are adjacent to the target rod; (b) the target rod and first set of rods are each, respectively, a threaded rod; (c) the target rod is elongated along a longitudinal axis of the target rod; (d) during the oscillations, the target rod undergoes stick-slip motion relative to the first set of rods, which stick-slip motion includes (i) slip motion, during which the target rod moves relative to the first set of rods in a direction substantially perpendicular to the longitudinal axis, while the target rod does not rotate about the longitudinal axis, and (ii) stick motion, during which the target rod moves relative to the first set of rods in a direction substantially perpendicular to the longitudinal axis, while the target rod rotates about the longitudinal axis; and (e) each respective oscillation of a respective rod in the first set of rods includes a first displacement and a second displacement, the first and second displacements being in substantially opposite directions, such that (i) the total distance traveled by the respective rod relative to the target rod in stick motion in the second displacement is greater than the total distance traveled by the respective rod relative to the target rod in stick motion in the first displacement; and (ii) the respective oscillation causes the target rod (A) to undergo a net, non-zero rotation about the longitudinal axis, and (B) to undergo a net, non-zero axial displacement along the longitudinal axis. In some cases, the total energy expended to move the respective rod during the first displacement is less than the total energy expended to move the respective rod during the second displacement. In some cases, the target rod and the first set of rods are arranged in a square packing arrangement during a portion, but not all, of each oscillation. In some cases: (a) the target rod and first set of rods comprise a system; and (b) the square packing arrangement is the highest energy state of the system that occurs during the oscillations. In some cases, the target rod and the first set of rods are arranged in a square packing arrangement immediately before a first displacement. In some cases: (a) during the first displacement, the target rod undergoes a first acceleration relative to the respective rod, which first acceleration has a magnitude that is greater than or equal to the magnitude of any other acceleration undergone by the target rod relative to the respective rod during the first displacement; (b) during the second displacement, the target rod undergoes a second acceleration relative to the respective rod, which second acceleration has a magnitude that is greater than or equal to the magnitude of any other acceleration undergone by the target rod relative to the respective rod during the second displacement; and (c) the magnitude of the second acceleration is less than the magnitude of the first acceleration. In some cases, the oscillations are in directions that are substantially perpendicular to the longitudinal axis of the target rod. In some cases, the first set of rods are elongated along longitudinal axes that are substantially parallel to the each other and to the longitudinal axis of the target rod. In some cases, an actuator applies a force against a rod in the first set of rods, which force is substantially constant in magnitude during at least the stick motion. In some cases, the oscillations are transmitted from the actuators to the first set of rods through one or more other rods. In some cases: (a) the target rod and the first set of rods are a subset of a second set of rods; and (b) the actuators are operatively connected to rods that are located in a perimeter region of the second set of rods. In some cases, multiple target rods simultaneously or sequentially undergo axial motion along respective longitudinal axes of the target rods. In some cases, the axial motions alter the shape of a surface, which surface includes, or is defined by position of, tips of the target rods. Each of the cases described above in this paragraph is an example of the method described in the first sentence of this paragraph, and is also an example of an embodiment of this invention that may be combined with other embodiments of this invention.

While exemplary implementations are disclosed, many other implementations will occur to one of ordinary skill in the art and are all within the scope of the invention. Each of the various embodiments described above may be combined with other described embodiments in order to provide multiple features. This invention includes not just the combination of all identified features but also includes combinations of only some of those features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also within the scope of the present invention. Numerous modifications may be made by one of ordinary skill in the art without departing from the scope of the invention.

What is claimed is:

1. An apparatus comprising:
(a) a set of threaded rods, the longitudinal axes of which are substantially parallel to each other, which set of rods has an interior region and a perimeter region, and which set of rods includes interior rods that are in the interior region and perimeter rods that are in the perimeter region,
(b) a set of linear actuators that includes linear guides, each linear guide being elongated and having a longitudinal axis that is substantially perpendicular to a longitudinal axis of, and that intersects, at least one threaded rod in the set of threaded rods; and
(c) a set of moveable parts, each moveable part being an element of or in physical contact with an actuator in the set of linear actuators;
wherein the linear actuators are configured to produce linear motions of the moveable parts, which linear motions
(i) are constrained by the linear guides,
(ii) are substantially perpendicular to the longitudinal axes of the set of threaded rods, and
(iii) induce vibrations in a set of the perimeter rods, which vibrations include components that are substantially perpendicular to the longitudinal axes of the set of threaded rods, and which vibrations are transmitted to the set of the interior rods, causing a target rod in the interior region to rotate about, and translate along, the longitudinal axis of the target rod.

2. The apparatus of claim 1, wherein each of the linear motions is in a straight line.

3. The apparatus of claim 1, wherein each of the linear actuators is a piezoelectric linear actuator.

4. The apparatus of claim 1, wherein each of the linear actuators, respectively, is a solenoid actuator that includes a spring and that is configured to push or pull the spring.

5. The apparatus of claim 1, wherein each of the linear actuators is a Lorenz voice coil actuator.

6. The apparatus of claim 1, wherein each of the linear actuators includes an inductive coil.

7. The apparatus of claim 1, wherein the threaded rods are helically threaded.

8. The apparatus of claim 1, wherein the moveable parts are configured to push against the set of perimeter rods.

9. The apparatus of claim 1, wherein:
(a) each given linear actuator in the set of actuators includes, or is adjacent to, a set of multiple mass-spring pairs for driving vibrations of a set of multiple perimeter rods;
(b) a first mass-spring pair in the set of mass-spring pairs has a natural frequency of vibration;
(c) a second mass-spring pair in the set of mass-spring pairs has another natural frequency of vibration;
(d) the first and second mass-spring pairs' natural frequencies are different from each other; and
(e) frequency of vibration of the given actuator is adjustable to a set of frequencies, which set of frequencies includes the first and second mass-spring pairs' natural frequencies.

10. The apparatus of claim 1, wherein:
(a) the apparatus further comprises one or more computers; and
(b) the one or more computers are programmed to control the actuators in such a way that the vibrations cause the target rod to undergo stick-slip motion relative to rods that are adjacent to the target rod.

11. The apparatus of claim 1, wherein:
(a) the set of rods comprises a system;
(b) the total potential energy of the system depends in part on the spatial arrangement of the rods relative to each other; and
(c) the total potential energy of the system is higher when the set of rods is arranged in a square packing arrangement than when the set of rods is in any other arrangement.

12. The apparatus of claim 1, wherein:
(a) the vibrations comprise oscillations; and
(b) the linear actuators are configured to cause the oscillations, in such a way that the target rod undergoes stick-slip motion relative to the first set of rods, which stick-slip motion includes
    (i) slip motion, during which the target rod moves relative to the first set of rods in a direction substantially perpendicular to the longitudinal axis of the target rod, while the target rod does not rotate about the longitudinal axis of the target rod, and
    (ii) stick motion, during which the target rod moves relative to the first set of rods in a direction substantially perpendicular to the longitudinal axis of the target rod, while the target rod rotates about the longitudinal axis of the target rod.

13. The apparatus of claim 12, wherein the linear actuators are configured to cause the oscillations, in such a way that:
(a) each particular oscillation of a particular rod in the first set of rods includes a first displacement and a second displacement, the first and second displacements being in substantially opposite directions;
(b) the total distance traveled by the particular rod relative to the target rod in stick motion in the second displacement is greater than the total distance traveled by the particular rod relative to the target rod in stick motion in the first displacement; and
(c) the particular oscillation causes the target rod
    (i) to undergo a net, non-zero rotation about the longitudinal axis of the target rod, and
    (ii) to undergo a net, non-zero axial displacement along the longitudinal axis of the target rod.

* * * * *